UNITED STATES PATENT OFFICE.

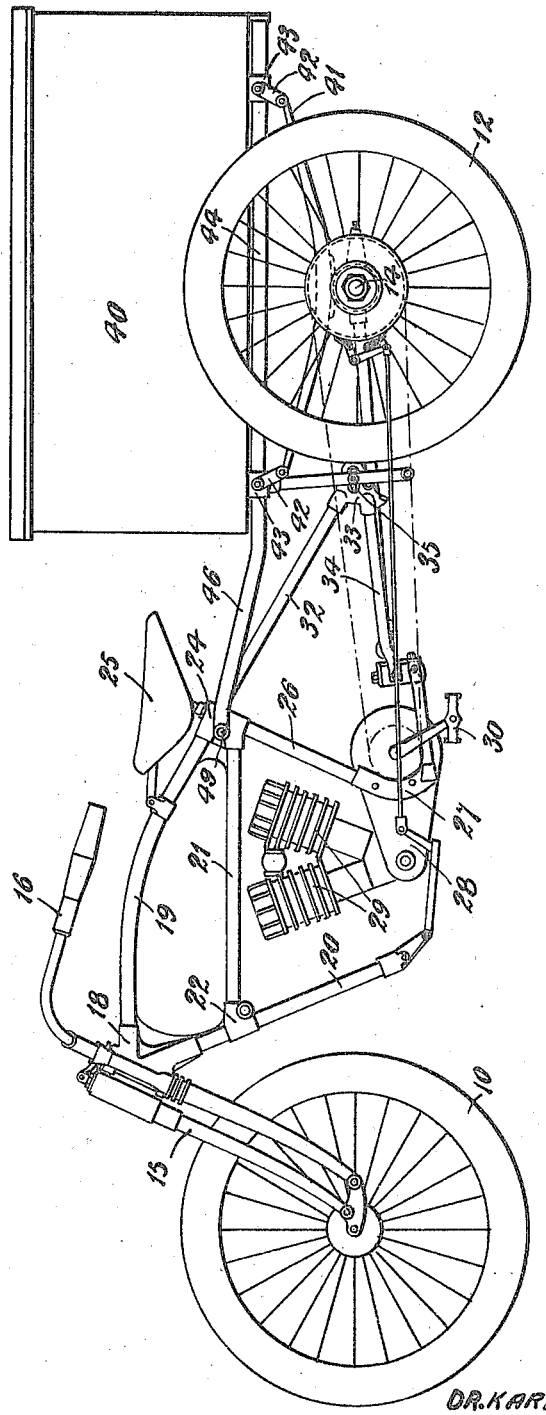

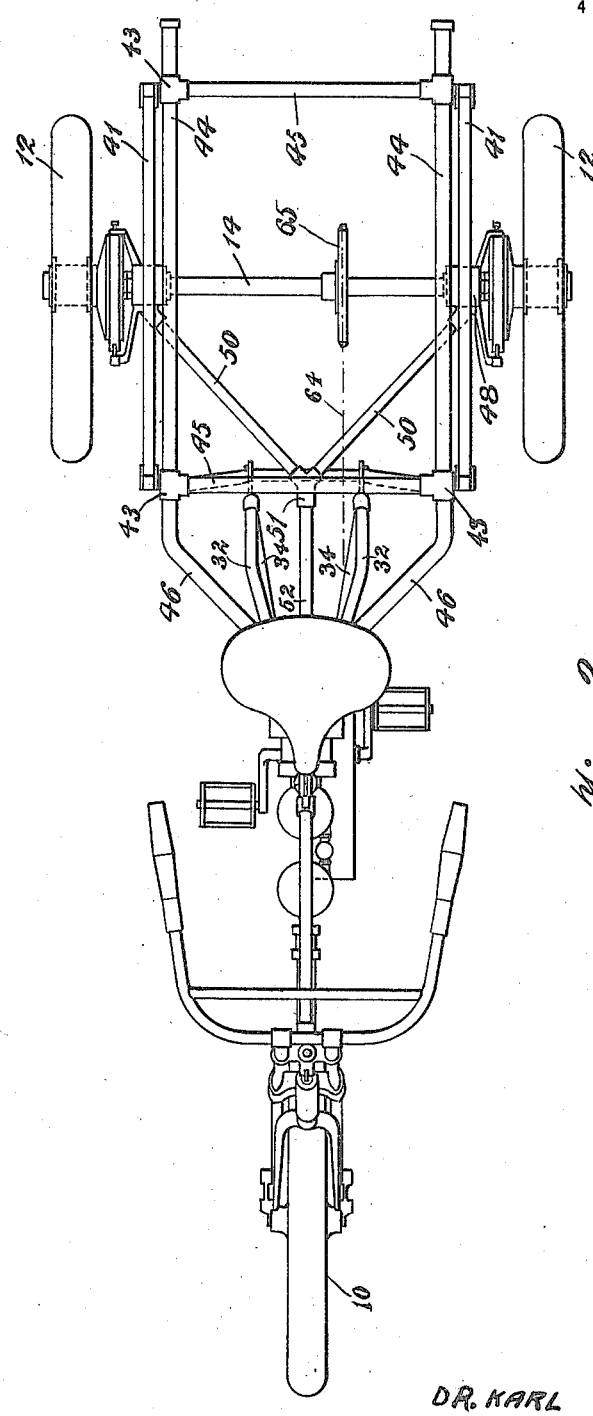

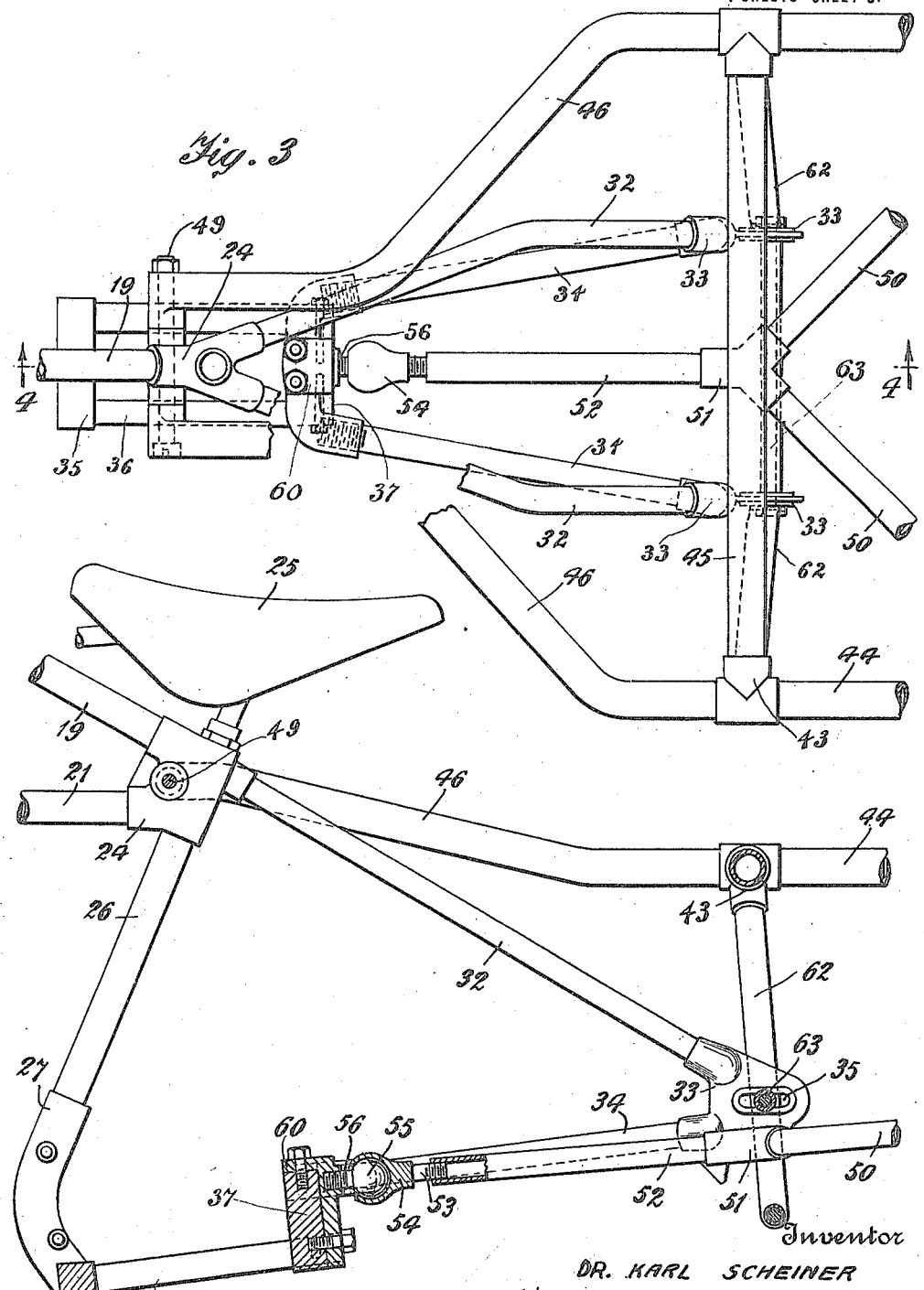

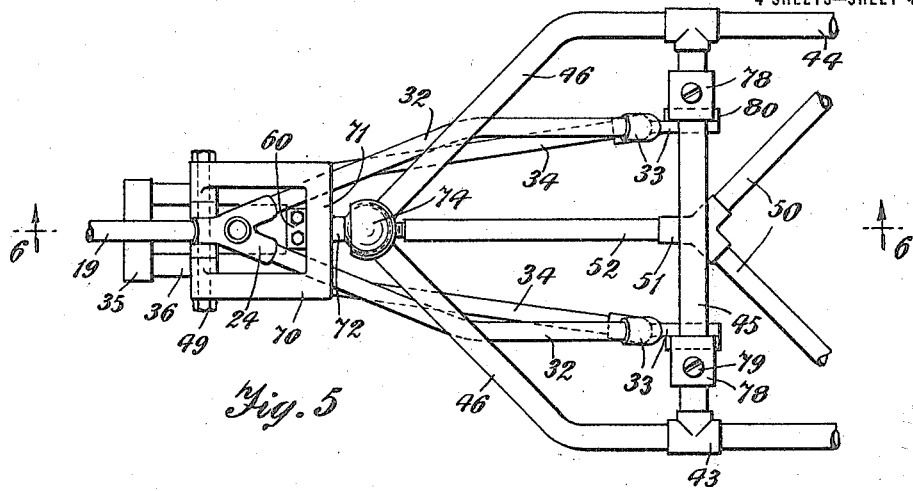
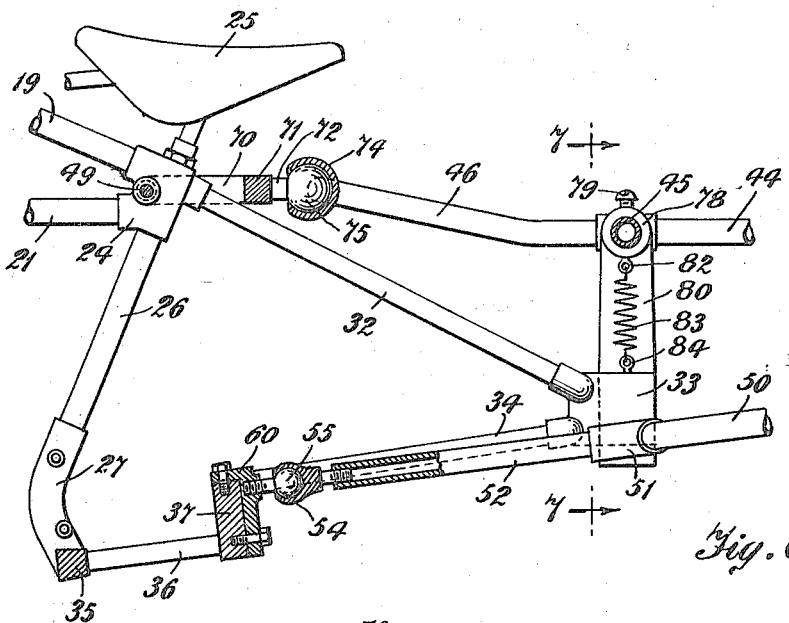
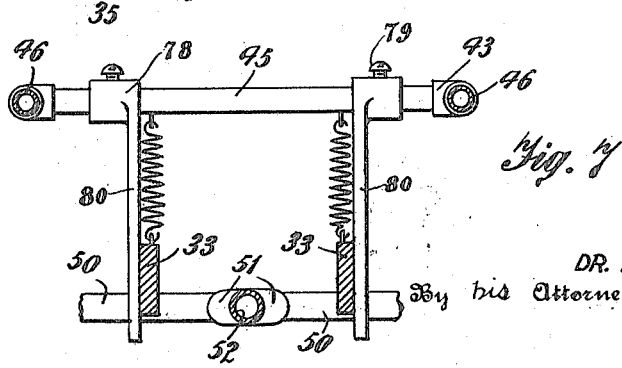

KARL SCHEINER, OF BROOKLYN, NEW YORK.

MOTOR-CYCLE.

1,264,212.         Specification of Letters Patent.         Patented Apr. 30, 1918.

Application filed November 19, 1917. Serial No. 202,733.

*To all whom it may concern:*

Be it known that Dr. KARL SCHEINER, a citizen of the United States, resident of Brooklyn, county of Kings, and State of New York, have invented certain new and useful Improvements in Motor-Cycles, of which the following is a specification.

This invention relates to improvements in frame construction for vehicles and has as its special object the provision of means whereby the frame of an ordinary motor cycle may be transformed into that of a goods or passenger carrier by the additions of a limited number of simple parts and without change in the main elements, such as wheels, motor, driving gear, steering means and seat of a motor cycle as now made. A further object is to provide a complete vehicle frame whereby the same purposes are attained.

These and other like objects are attained by the novel construction and combination of parts hereinafter described and shown in the accompanying drawings, forming a material part of this specification, and in which, Figure 1 is a side elevational view, showing a complete vehicle in accordance with the invention.

Fig. 2 is a top plan view thereof.

Fig. 3 is a fragmental plan view, drawn to an enlarged scale, the seat being removed.

Fig. 4 is a vertical sectional view taken substantially on line 4—4 of Fig. 3.

Fig. 5 is a fragmental top plan view showing a modified form of the frame.

Fig. 6 is a side elevational and vertical sectional view, the section being taken on line 6—6 of Fig. 5, and Fig. 7 is a transverse sectional view taken on line 7—7 of Fig. 6.

In carrying out the invention use may be made of the frame of an ordinary motor cycle, provided with a front wheel 10 and rear wheel 12, arranged upon an axle 14. The front wheel operates between forks 15, steered by the handle bars 16, and secured to the forks, at their upper ends, is a standard fitting 18, in the upper opening of which is engaged a bar 19, a strut 20, connecting with the lower opening of the fitting, while a horizontal bar 21, connects between the fitting 22, on the strut and a seat support 24 in which is engaged the seat 25 and also has connected the rear end of the bar 19, forming in effect a variety of the well known diamond frame.

Extending downward from the seat support 24 is a bar 26 formed with a bracket 27, to which is engaged the gear casing 28 of the motor 29. A pair of oppositely disposed pedals 30, have their shaft pass through the casing and are connected with the gearing so that the vehicle can be propelled by foot power when desired.

Angularly disposed bars 32, are engaged in the rear yokes 33 in their upper openings, while in the lower openings are other tubular bars 34, extending to the engine frame, which is comprised of a cross bar 35, engaged with the bracket 27, and parallel bars 36 which connect with a cross block 37, in which the bars 34 are fixed.

The improvement consists in the application of parts which serve to lengthen and widen the frame so that a container 40, of considerable magnitude, or passenger seats may be readily carried and operated as a part of the vehicle.

To this purpose a pair of wheels 12 are secured to the axle 14, on which is mounted a pair of semi-elliptic springs 41 by brackets 48, the springs being engaged by pivoted links 42 with end fittings 43, secured upon horizontal tubular bars 44, having engaged between them cross bars 45, forming a rectangular frame, at the front of which the extending ends 46 of the side bars 44 are bent toward each other and pivotally connected by a bolt 49 to the seat support 24.

In the spring brackets 48 are also engaged the ends of angularly disposed tubular bars 50, connected at their converging front ends by a Y fitting 51, in the straight front opening of which is secured a tubular bar 52, internally screw threaded at its outer end to receive a threaded stem 53, formed with a cup 54, containing a spherical element 55, freely movable therein and engaged by a stem 56 to a bracket 60 secured to the block 37 of the engine supporting frame.

Extending from the fittings 43 and engaging between the side bars 44 and braces 45, are the bars 62 carrying bolts 63 freely slidable in the slots 35, of the yokes which formerly contained the rear axle, thus providing an extension frame upon which the car or container 40 may be mounted and which can be used with the main frame of the motor cycle without material change therein, the drive chain 64 being lengthened to convey motion to the driving sprocket 65.

Due to the adjustability of the bar 52 and flexibility of its outer connection with the sphere 55, the entire frame is rendered limitedly flexible, while wear and lost motion may be taken up by adjustment of the bar 52.

In the modification shown in Figs. 5 and 7 inclusive, the frame elements are arranged to obtain greater flexibility, so that should the vehicle be operated upon an uneven surface and one of the rear wheels raised above the other, such twisting movement is not transmitted to the seat or front portion of the frame. This is accomplished in the following manner,—

A loop yoke 70, is engaged by the bolt 49 with the seat support 24 the loop extending rearwardly and to its cross bar 71, is rigidly engaged a stem 72, connected with a spherical element 75, circumjacent to which is a cup 74, to which the converging ends of the bar elements 46 are rigidly engaged, thus permitting a torsional movement of the bars relatively to the loop 70, as will be readily understood.

In order to prevent lateral movement of the rear element, relative to the front portion of the frame, there is secured to the front cross bar 45, a pair of oppositely disposed brackets 78, held by screws 79, and formed with the brackets are extending flat plates 80, the same making contact with the outer sides of the yokes 33, so that the frame is held substantially central of the yokes irrespective of the difference in height of the wheels. In order to prevent undue movement of the upper frame, upon which the car is carried, there is also attached to the lower side of the brackets 78, eyes 82, in which are engaged helically wound tension springs 83, their lower ends engaging in similar eyes 84, secured in the upper portion of the yokes 33, as can best be seen in Fig. 6. Thus the new parts of the frame are held in resilient relation to the standard part of the frame, thereby permitting the axle 14 to assume a position other than that of horizontal and giving a desirable degree of flexibility to the vehicle.

Having thus described my invention, what I claim as new and desire to secure by Letters Patent, is,—

1. In an extension frame for motor cycles, the combination with the standard frame, of a supplementary frame comprised of a pair of horizontal bars disposed in parallel and spaced at their rear, converging elements formed with said bars at the front end thereof, pivoted connections between said elements and the seat post of said standard frame, cross bars between said parallel bars, springs engaging between the axle and said bars, converging connections extending from the spring seat on said axle, a central bar engaged in said connection, a universal joint between the front end of said bar and the motor frame, and means for limitedly adjusting the length of said bar.

2. In an extension frame for motor cycles, the combination with a standard frame, a motor carried thereby and a pair of rear wheels having an axle extending therebetween, of a rectangular frame mounted on said axle adapted to receive a car, springs interposed between said axle and said rectangular frame, extensions formed with said rectangular frame pivoted to said standard frame, converging, front extending bars secured to said axle, connections between said bars and said motor, means for lengthening or shortening said connections, and a spherical joint interposed between said connections.

3. In a vehicle frame the combination with a single dirigible front wheel, a pair of rear wheels, an axle upon which said rear wheels are mounted, and a driving means for said axle, of a sectional frame comprised of a front section engaged with said front wheel, and an engine carried in said front section, of a rear section mounted on said axle, a car carried on said rear section, spaced yokes rigidly set in said front section, universal joints between the upper and lower connection of said frame section, and means for limitedly adjusting the lower of said joint connections.

4. In a vehicle frame, the combination with a front section, and a single dirigible wheel rotatably mounted therein, of a rear section, a car carried thereby, a pair of spaced wheels for supporting said rear section, universal joint connections between said sections, whereby said rear section may move axially with relation to said front section, and means for preventing side movement of said rear section relative to said front section.

In testimony whereof I have affixed my signature.

Dr. KARL SCHEINER.